United States Patent [19]

Hellon

[11] Patent Number: 5,165,306
[45] Date of Patent: Nov. 24, 1992

[54] VEHICLE STABILIZER BAR END LINK

[75] Inventor: Keith Hellon, Libertyville, Ill.

[73] Assignee: MacLean-Fogg Company, Mundelein, Ill.

[21] Appl. No.: 594,914

[22] Filed: Oct. 4, 1990

[51] Int. Cl.⁵ .................. G05G 1/00; F16C 11/06; B60G 00/00
[52] U.S. Cl. .................. 74/588; 74/579 R; 403/56; 403/133; 280/673; 280/674; 280/689
[58] Field of Search .................. 280/689, 663–665, 280/699; 267/67; 403/133, 143, 56; 29/513, 897; 74/588, 579 R

[56] References Cited

U.S. PATENT DOCUMENTS

| | | | |
|---|---|---|---|
| 916,669 | 4/1909 | Wilson | 403/143 |
| 1,817,529 | 8/1931 | Skillman | 74/588 |
| 1,912,780 | 6/1933 | Lautz | 403/56 |
| 1,929,807 | 10/1933 | Casper | 74/588 |
| 2,886,341 | 5/1959 | MacPherson | 403/56 |
| 4,197,027 | 4/1980 | Scheerer | 403/56 |
| 4,360,284 | 11/1982 | Brandenburg | 29/513 |
| 4,725,159 | 4/1988 | Wood | 403/133 |
| 4,750,885 | 6/1988 | Ito | 403/133 |
| 4,773,659 | 9/1988 | Rygiel | 280/142 |
| 4,983,066 | 1/1991 | Becher et al. | 29/513 |

FOREIGN PATENT DOCUMENTS

| | | | |
|---|---|---|---|
| 0575296 | 4/1933 | Fed. Rep. of Germany | 403/56 |
| 0041724 | 2/1990 | Japan | 29/513 |
| 1198365 | 7/1970 | United Kingdom | 403/133 |

Primary Examiner—David M. Mitchell
Assistant Examiner—Paul Dickson
Attorney, Agent, or Firm—Willian Brinks Olds Hofer Gilson Lione

[57] ABSTRACT

A vehicle stabilizer bar end link includes a force absorbing and force transmitting arm having a ball stud connector at each end. The force transmitting arm portion is fabricated by crimping together two similarly configured stampings to provide a rigid torsion resistant arm. Each ball stud connector is secured between the stampings during assembly to form a ball and socket joint and includes a threaded portion extending generally at right angles to the longitudinal axis of the arm. The invention may be used in one form as a connecting link between various suspension components of a vehicle chassis.

5 Claims, 1 Drawing Sheet

VEHICLE STABILIZER BAR END LINK

FIELD OF THE INVENTION

This invention relates to vehicle suspension systems and in particular to a suspension link for connecting movable parts of a vehicle suspension.

BACKGROUND OF THE INVENTION

For many years, automobiles and other vehicles have been provided with different types of suspension systems designed to absorb road shock and other vibrations to provide a smoother, more comfortable ride for the occupants of the vehicle.

In many of these designs, vehicles have been provided with independent suspension configurations at each wheel which are designed to diminish the effect of the corresponding wheel on the other side of the "axle". Often stabilizer bars are used to increase the roll rigidity as well.

Many of the designs attempt to allow the wheel to move up and down in a more vertical path of travel than would be possible if two of the wheels were connected by a rigid axle. In order to permit this type of movement, the suspension system designs utilize several suspension links between the vehicle body or frame and the wheel support itself. The suspension links take many configurations or curved shapes and have typically been formed in a forging operation where a solid bar is connected by a ball and socket joint to a threaded connector on each end. The conventional practice of utilizing a solid, forged rod requires multiple machining operations to provide means for connecting a reliable bearing for the connector element and, because of their mass, add substantial weight to the vehicle's suspension system.

In suspension designs of this type, a stabilizer bar is generally incorporated to increase the roll rigidity and improve the steering stability of the vehicle. Typically, the stabilizer bar is a rod-like, elastic member having a central torsion bar portion oriented laterally of the vehicle and two integral arm Portions provided at each end of the central rod portion forming substantially the shape of three sides of a polygon. The central rod portion, generally adjacent to each arm portion, is rotatably supported about a longitudinal axis from the vehicle body and each of the ends of the arms are coupled to a suspension arm by a connector link. When the vehicle is subjected to rolling, for example, by centrifugal force, the arm portions pivot relatively about the longitudinal axis of the central rod portion causing torsion forces which, through the arms, urge the suspension arms of the vehicle toward their normal position.

These types of torsional stabilizer bars have proven useful in vehicles for many years and examples of stabilizer bars having similar configurations are shown in U.S. Pat. Nos. 2,660,449, 3,181,885, 3,733,087, 4,066,278 and 4,143,887. These stabilizers act in a manner that when a pair of left and right wheels differ in level from each other due to a cornering maneuver, the vehicle body will be prevented from excessive rolling or leaning to either side by torsional or other resistance produced in the stabilizer bar.

In response to the driving public demands, more "sporty" cornering capability, automotive designers have increased the diameters of conventional stabilizer bars. Although this modification beneficially increases roll stiffness, it also degrades the ride quality in many cases. While designers have thought to enhance the function of stabilizer bars in a variety of ways, such as the adjustable suspension stabilizer bar shown in U.S. Pat. No. 4,648,620, very little attention has been paid to other elements of the suspension system. For example, many improvements have been made in shock absorbers and tire constructions as well as various independent suspension arms and new designs. For the past twenty years there has been substantially no improvement or change in the stabilizer bar end links or connectors for the various elements of the suspension system.

Vehicle suspension system connectors such as the stabilizer bar end links have essentially remained unchanged for many years. These attachments as well as many other suspension system attachments experience a variety of environments which result in corrosion and failure during the useful life of the vehicle. The lifetime of such an attachment will depend upon its components ability to maintain their original dimensions and material characteristics. Because these vehicle components are primarily utilized on the under carriage of a vehicle, they are subjected to the harsh effects of rain, salt and sleet.

Typically, these attachments are assemblies of many different components which must be manually assembled during the production of a vehicle. Stabilizer bar end links generally fall into one of two broad categories, a bolt-type construction or a swivel link construction. In the bolt-type construction, a suitably dimensioned bolt is used to connect the stabilizer bar to the vehicle body. The presently used bolt-type construction include numerous steel parts which are subject to the corrosive effects of the environment, primarily road salts and moisture. The attachment includes several rubber bushing or grommet portions which, are to a lesser degree, affected by the same environmental hazards. When assembled, the bolt-type link has its head and retaining nut in engagement with a pair of outer washers which are cushioned by pliable bushings or grommets engaging the exterior surfaces of the stabilizer bar arms and the vehicle suspension arms. A pair of similarly shaped grommets engage the interior surfaces of the respective vehicle elements and are in engagement with a pair of inner washers which are maintained at a predetermined spaced distance by a cylindrical sleeve mounted on the shaft of the bolt. Therefore, typically, this type of construction includes up to eleven elements, seven of which are made of steel. Typically the steel is treated with a conventional plating to assist in the prevention of corrosion. However, all of the abutment points, primarily between the bolt head or retainer nut and the respective adjacent washer and between the ends of the spacer sleeve and adjacent interior pair of washers. Spaces between these elements permit the introduction of road salts and moisture which lead to corrosion and degradation of the part. A high incidence of severely rusted bolt components has been found in vehicles during the course of their use. Depending upon the particular climate in the area in which the vehicle is used, more or less corrosion in the metal components have been noted.

While corrosion has often caused premature failure of the attachment assembly during normal use, it is often necessary to change the rubber bushings or grommets which become incapable of performing their intended function due to the environmental degradation. In this situation, the attachment must be disassembled to replace the worn bushing elements and quite often during this operation the bolt portion is broken due to the torsional forces during the attempt at disassembly or must be cut apart to make the disassembly possible.

The other type of stabilizer bar end link, sometimes known as a swivel link, includes two connectors extending at right angles to the longitudinal axis of the link itself. Typically, the swivel link type utilizes a pair of ball studs whereby the stud is held in a ball and socket joint which permits movement through a conical angle of 30° or more. This substantially larger angular movement, compared to a possible total of approximately 20° for the bolt-type construction. Conventional swivel links have utilized a solid forged rod or bar with ball studs at opposite ends for attachment to the stabilizer bar and the vehicle frame. However, as noted previously, multiple machine operations are necessary and because of their substantial mass, these types of swivel links add substantial weight to the vehicle.

SUMMARY OF THE INVENTION

According to the present invention, a vehicle suspension link or attachment includes a force absorbing and force transmitting arm having a pivotal, ball stud type connector at each end. The force transmitting arm portion is fabricated by crimping together two similarly configured stampings to provide a rigid torsion-resistant arm. Each connector is secured between the stampings to form a ball and socket joint and includes a stud-like threaded portion extending at generally right angles from the longitudinal axis of the arm. The invention is used in one form as a connecting link between various suspension components of a vehicle chassis.

An object of the present invention is to provide a light weight, rigid vehicle suspension link which is less costly to produce.

Another object of the present invention is to provide a link attachment formed by crimping together two identical stampings in a manner which encapsulates the end connector element.

Another object of the present invention is to provide a stabilizer bar end link utilizing a pair of ball-type stud connectors captured therein during the assembly process.

Another object of the present invention is to provide a more efficient and less costly suspension link which is of sufficient rigidity, yet utilizing substantially less raw material.

Other objects and advantages of the present invention will become apparent upon reference to the accompanying description when taken in conjunction with the following drawings.

DETAILED DESCRIPTION OF THE PREFERRED EMBODIMENT

Figure 1:
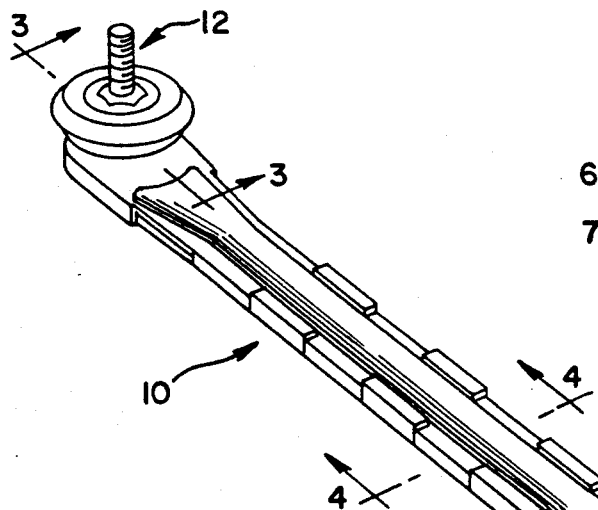
FIG. 1 is a perspective view of an assembled stabilizer bar end link made in accordance with the concepts of the present invention.

Referring to FIG. 1, a stabilizer bar end link, generally designated 10, is shown with a pair of ball stud connectors 12 on each end. The ball stud connectors 12 are pivotally connected to the opposite ends of the stabilizer bar end link 10 as will be described in greater detail hereinafter with respect to FIG. 3. Each threaded connector 12 extends in a direction generally at right angles to the longitudinal axis of the stabilizer bar end link in opposite directions.

Figure 2:
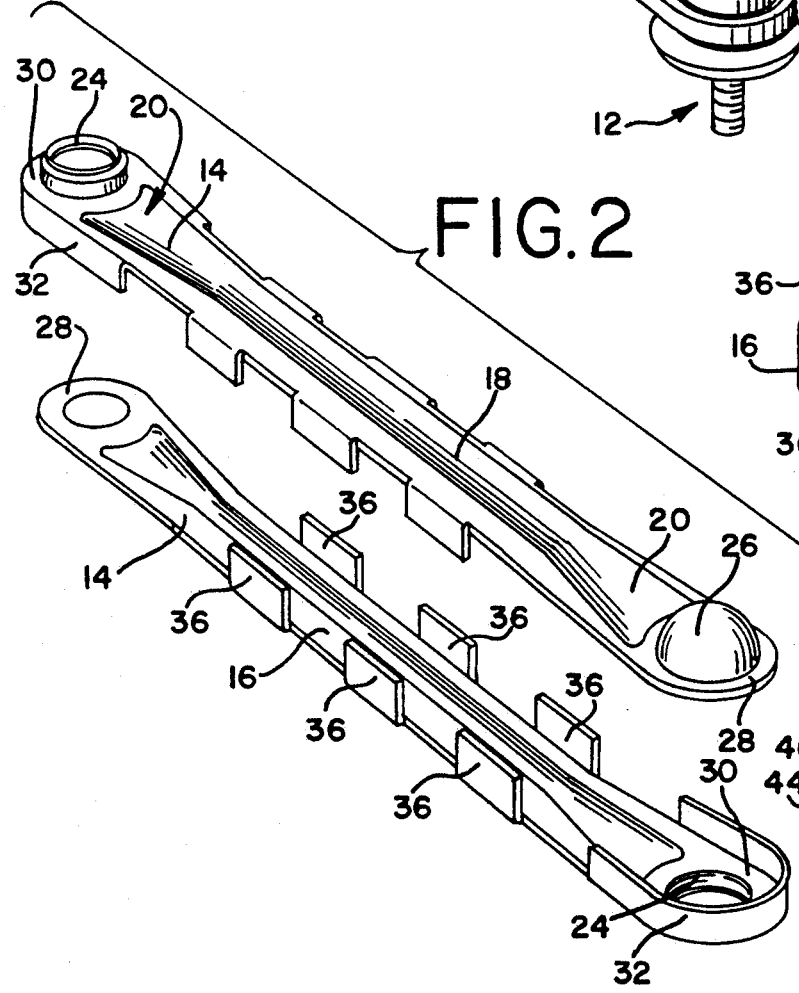
FIG. 2 is an exploded view of the two stamped stabilizer bar end link components prior to assembly and crimping.

Referring in particular to FIG. 2, each stabilizer bar end link results from the assembly of two identical stampings 14 as described below. Each stamping, in raw material form, is in the form of a flat generally elongated blank plate 16. The blank steel plate is preferably cold rolled low carbon. The plate 16 is thereafter formed in a stamping operation to the shape as shown in FIG. 2 to include a "backbone" in the form of a longitudinal, semi-circular protrusion 18 which adds substantial rigidity to the assembled stabilizer bar end link 10. The protrusion 18 is tapered downwardly and into the plate 16 at each end in a slightly flared fashion as shown at 20 on either end of the plate 14 to provide a smooth transition between the surface or plane of the plate 16 and the rigidified protrusion 18.

Figure 4:
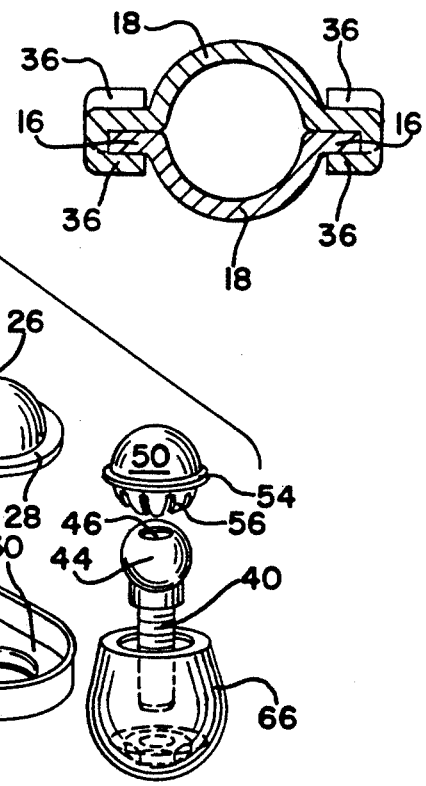
FIG. 4 is a vertical section through the center of the stabilizer bar end link taken generally along line 4—4 of FIG. 1.

Referring again to FIG. 2, the ends of the plate 16 are formed in the stamping operation to provide a means for journalling the ball studs 12 so that they extend generally at right angles from the stabilizer bar end link 10 as shown in FIG. 1. More particularly, an aperture 24 is formed at the left end of the top stamping as shown in FIG. 2 and a dome portion 26 is formed at the right end of the stamping as also shown in FIG. 2. The dome 26 is surrounded by a continuous flat generally circular flange 28 which lies in the same plane as that of the plate 16. Referring now to the lower piece in FIG. 2, the apertured end includes a similarly dimensioned flange 30 which is surrounded by a horseshoe-shaped, upwardly extending flange 32. During the assembly of the two components, the flange 28 mates with the flange portion 30 and is secured by crimping or rolling the flange 32 inwardly. In addition, each of the stampings includes a plurality of, in the preferred embodiment, six tabs 36 which are formed in the stamping operation to extend at right angles to the plane of the plate 16. During the assembly or crimping operation, the tabs 36 are nestled between the complementary set of tabs 36 on the mating part and folded or crimped over to securely fasten the mating elements to one another. The appearance of the flanges in their final crimped configuration can be seen in the cross section shown in FIG. 4. The final assembled product includes a generally circular or tubular element formed by the protrusions 18 as a main longitudinal rigidifying component having a substantially high moment of inertia to resist flexing or bending forces and the crimping of the tabs and end flanges 32 provide an integral, gap free attachment between the two identical, complementary stamping portions. It can therefore be seen that substantial cost saving in terms of the manufacturing process as well as weight savings in the end product can be achieved through the use of the present invention. The partially tubular shape adds substantially to the rigidity and strength of the stabilizer bar end link 10 while the ease and convenience of using a pair of identical stamping elements to form each link provides additional manufacturing efficiencies and resultant cost savings.

Figure 3:
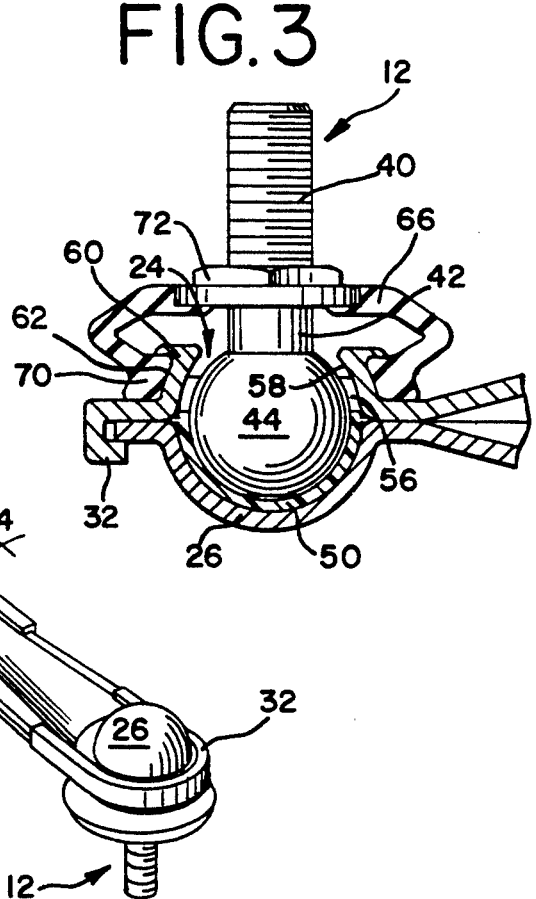
FIG. 3 is a vertical section showing one of the connector elements taken generally along line 3—3 of FIG. 1.

Each ball stud 12, referring to FIG. 3, includes a threaded, stud-type extension 40 which, as previously described, extend in opposite directions at the respective ends of one stabilizer bar end link 10. The stud 40 includes a non-threaded portion 42 and a spherical ball portion 44. The ball portion 44 may include a relief 46 at the opposite end as shown in FIG. 2 which can be filled with a grease or lubricant prior to assembly. During assembly, a bushing 50 is inserted between the dome 26 and the ball portion 44 of the connector. The bushing 50 includes a complementary-shaped dome portion which fits snugly within the dome 26 at each end of the link. The hemispherical dome portion 50 terminates in a generally circular flange 54 and the bearing continues around the ball 44 with a plurality of spaced fingers 56. The flexibility of the fingers 56 permit the ball 44 to be inserted within the bushing prior to assembly. The bushing 50 is made of acetal or other suitable material such as high density polypropylene to provide extended life for the ball and socket joint of the connector during assembly. It is desirable that suitable lubricants be inserted at the time of assembly.

Referring to FIG. 3, the detail assembly for the connector is shown whereby the dome portion 50 terminates in the flange 54 which lies exactly along the connection plane between the complementary portions of the link. The shape inside the apertured end 58 is also spherically complementary to the finger side of the bushing 56, thus retaining the ball 44 and bushing after clinching together the stampings. Furthermore, the flange 54, prevents unwanted rotation or oscillation of the bushing 50 between the stampings 18. The wall 58 around the entire aperture provides a generally truncated conically-shaped surface which terminates in an outwardly directed or reverse flange portion 60. The lower or inner portion of the flange 60 which is generally parallel to the opposed outer surface of the flange 30. Both surfaces 30 and 60 terminate in a smooth juncture with the exterior surface of the truncated conical portion 58 of the aperture forming three sides of a parallelogram in cross section which is a full circular groove. The groove 62 serves as a seat for a boot 66 which closes the aperture 24. In particular, the boot 66 includes a generally trapezoidal-shaped bead 70 which seats within the groove 62. The boot extends upwardly and outwardly in a conical fashion and then reverses inwardly where it is bonded to a nut 72 The integral boot and nut are threaded onto the threaded portion 40 of the ball stud to the limit of the threads and the bead 70 is fit within the grooves 62 to form a water-tight seal around the ball and socket joint thus formed to prevent corrosion by elements which could otherwise attack the journal.

As can be seen from the foregoing description, a complete, lightweight yet rigid stabilizer bar end link 10 can be made with the use of only four different parts. The assembly includes two stampings 14, two bushings 50, two ball studs 12 and two nut/boot components. As described previously, the ball portion 44 of the connectors is inserted within the bushing 50 and assembled so that the threaded portion 40 extends through the aperture 24 at either end of the stampings 16. The tabs 36 and flange 32 are crimped or rolled to complete the connection and the nut/boot element is mounted on each connector to provide a finished product.

The foregoing detailed description has been given for clearness of understanding only and no unnecessary limitations should be understood therefrom as modifications will be obvious to those skilled in the art.

I claim:

1. A link for connecting suspension components of a vehicle chassis, comprising:

a force transmitting arm having opposite ends;

said arm being formed from identical, elongated first and second metal plates mated together along their lengths;

each of said plates having a dome formed in one of its two ends and an aperture formed through the other of its two ends;

each of said dome and aperture in each plate being substantially surrounded by a continuous flat flange;

a horseshoe shaped flange extending perpendicularly from the flat flange and substantially surrounding one of the aperture and dome in each plate;

a plurality of spaced apart tabs formed in each plate and extending at right angles to the plane of the plate;

said plates being mated together with the dome end of said first plate positioned over the aperture end of said second plate;

when mated together the tabs on each plate being nested between the tabs on the other plate and crimped onto said other plate, and the horseshoe shaped flange on each plate being crimped over a flat flange on the other plate;

a pair of ball studs, each comprising a ball and a stud;

the ball in one of said ball studs being journaled in the dome of said first plate with its stud extending through the aperture in said second plate and the ball in the other of said ball studs being journaled in the dome of said second plate with its stud extending through the aperture in said first plate.

2. The connecting link of claim 1 further characterized in that:

the ball of each ball stud is seated in a bushing;

each of said bushings having a generally circular flange formed around its periphery;

the circular flange on each bushing being fixed between opposed plates when they are crimped together.

3. The connecting link of claim 1 further characterized in that:

an outwardly extending flange is formed around each aperture.

4. The connecting link of claim 3 further characterized by and including:

flexible sealing means seated over each aperture and around its corresponding outwardly extending flange.

5. The connecting link of claim 1 further characterized in that:

each of said plates include a longitudinal protrusion forming a backbone in that plate.

* * * * *